United States Patent [19]

Behney

[11] 4,227,311
[45] Oct. 14, 1980

[54] METHOD AND APPARATUS FOR ALTERING AN EQUINE LEG CONFORMATION

[76] Inventor: Charles A. Behney, Box 4337, Bisbee, Ariz. 85603

[21] Appl. No.: 16,280

[22] Filed: Feb. 28, 1979

[51] Int. Cl.³ .............................................. A01L 11/00
[52] U.S. Cl. ........................................ 33/195; 33/3 C
[58] Field of Search ...................... 33/195, 3 R, 3 C, 6, 33/3 B, 3 A

[56] References Cited

U.S. PATENT DOCUMENTS

| | | | |
|---|---|---|---|
| 583,706 | 6/1897 | Kearns et al. ......................... | 33/195 |
| 2,331,177 | 10/1943 | Pesco ..................................... | 33/3 C |

FOREIGN PATENT DOCUMENTS

7373: 12/1916 Switzerland ............................. 33/3 A

Primary Examiner—William D. Martin, Jr.
Attorney, Agent, or Firm—Gerlach & O'Brien

[57] ABSTRACT

An equine leg conformation is altered by bracing the hoof against shifting movement while standing on a supporting surface, wedging the hoof to tilt it with respect to the surface into an attitude which serves to provide a desired altered leg configuration, and altering the support for the leg to provide a hoof attitude in normal use equivalent to the aforesaid attitude. Apparatus for use in altering the leg conformation includes a base providing a supporting surface for the hoof, means on the base for bracing the hoof against shifting movement, and wedge means advanceable on the base in the direction of the bracing means for tilting the hoof with respect to the supporting surface into an attitude which serves to provide a desired leg conformation.

17 Claims, 9 Drawing Figures

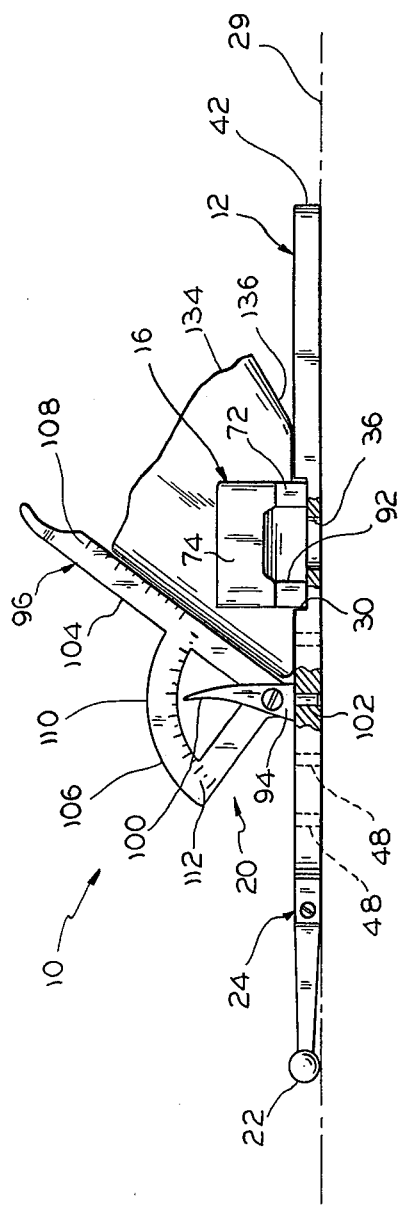

METHOD AND APPARATUS FOR ALTERING AN EQUINE LEG CONFORMATION

BACKGROUND OF THE INVENTION

This invention relates to a method of altering an equine leg conformation and to an apparatus for use in the method. More particularly, the invention relates to a method in which the hoof of the equine leg is wedged into a tilted attitude which serves to provide a desired altered leg conformation, and the support for the leg is altered to provide a hoof attitude in normal use equivalent to the tilted attitude.

The equine leg may suffer from various conformational abnormalities, which interfere with performance, render the animal more prone to injury, and/or detract from the appearance of the animal. Various abnormalities may be corrected by suitably trimming the hoof of an affected leg and/or employing a corrective shoe on the hoof. The amount of trimming or the extent of correction provided by a shoe is determined on the basis of visual examination and experience, and often, the wrong side of the hoof is trimmed. U.S. Pat. No. 1,016,571 discloses a farriery implement which apparently may be used for supporting the leg and tilting the hoof in various directions, after which the hoof may be scribed to indicate a hoof portion to be removed for accomplishing a desired alteration of the leg conformation. However, I am not aware of any current or past use of this type of implement.

A need exists for a method and apparatus for altering an equine leg conformation, which are suited to the requirements of veterinarians, farriers, instructors and others concerned with proper care, correction of abnormalities, handling and appearance of horses, mules, and other solipeds. The method and apparatus should serve to reliably determine the amount and the location of alteration of the support for the leg which is required to provide a desired leg conformation in normal use.

SUMMARY OF THE INVENTION

The invention provides a method of altering an equine leg conformation, which method includes the steps of bracing an equine hoof against shifting movement while standing on a supporting surface, wedging the hoof to tilt it with respect to the supporting surface into an attitude which serves to provide a desired altered leg conformation, and altering the support for the leg to provide a hoof attitude in normal use equivalent to the aforesaid attitude.

The invention also provides apparatus for use in the foregoing method, which apparatus includes a base providing a supporting surface for an equine hoof, means on the base for bracing the hoof against shifting movement, and wedge means advanceable on the base in the direction of the bracing means for tilting the hoof with respect to the supporting surface into an attitude which serves to provide a desired altered leg conformation.

The invention fulfills the above-described need for a method and apparatus for altering an equine leg conformation, which meet the requirements of those working with the animals. A simple, accurate and reliable method and apparatus are provided. The apparatus is portable and is readily utilized by a single individual. The invention removes the guesswork from the trimming and/or shoeing steps designed to correct or compensate for abnormalities.

The invention is especially well suited for placing the hoof in a tilted attitude which provides a desired altered leg conformation, while the animal is standing with its weight completely on the hoof. The apparatus is compact and low to the ground, so that the hoof is readily placed thereon, the leg remains in the proper position relative to the remainder of the body, and the hoof is maintained in place without difficulty during the use of the apparatus.

The invention is especially useful for straightening crooked legs, including bow legs, knock knees, and other conditions in which base-wide, base-narrow, toe-out and/or toe-in conformation is present. The invention may be employed to alter leg conformation for other purposes, such as to afford relief from pressure and/or pain, as experienced with arthritic joints.

In a preferred embodiment of the invention, an elongated bar is arranged on the base for use as a guide to proper alignment of the leg, which bar may comprise the rule of a combined rule and protractor, the latter also serving to indicate the length and the angle of the hoof. The apparatus advantageously further includes means for indicating the hoof shoe size and width or spread.

BRIEF DESCRIPTION OF THE DRAWINGS

The attached drawings illustrate preferred embodiments of the method and apparatus of the invention, without limitation thereto. In the drawings, like elements are identified by like reference symbols in each of the views, and:

FIG. 3 is a side elevational view thereof, taken substantially on line 3—3 of FIG. 2, with a part broken away and in section, showing the hoof in full lines and prior to wedging;

FIG. 4 is a front elevational and partly sectional view thereof, taken substantially on line 4—4 of FIG. 2, showing the hoof in full lines and in a tilted attitude after being wedged, and also showing a wedging or prying tool in engagement with the wedge;

FIG. 5 is a fragmentary longitudinal sectional view of the apparatus, taken substantially on line 5—5 of FIG. 2, illustrating a bracing member and a portion of a base;

DESCRIPTION OF THE PREFERRED EMBODIMENTS

Figure 1:
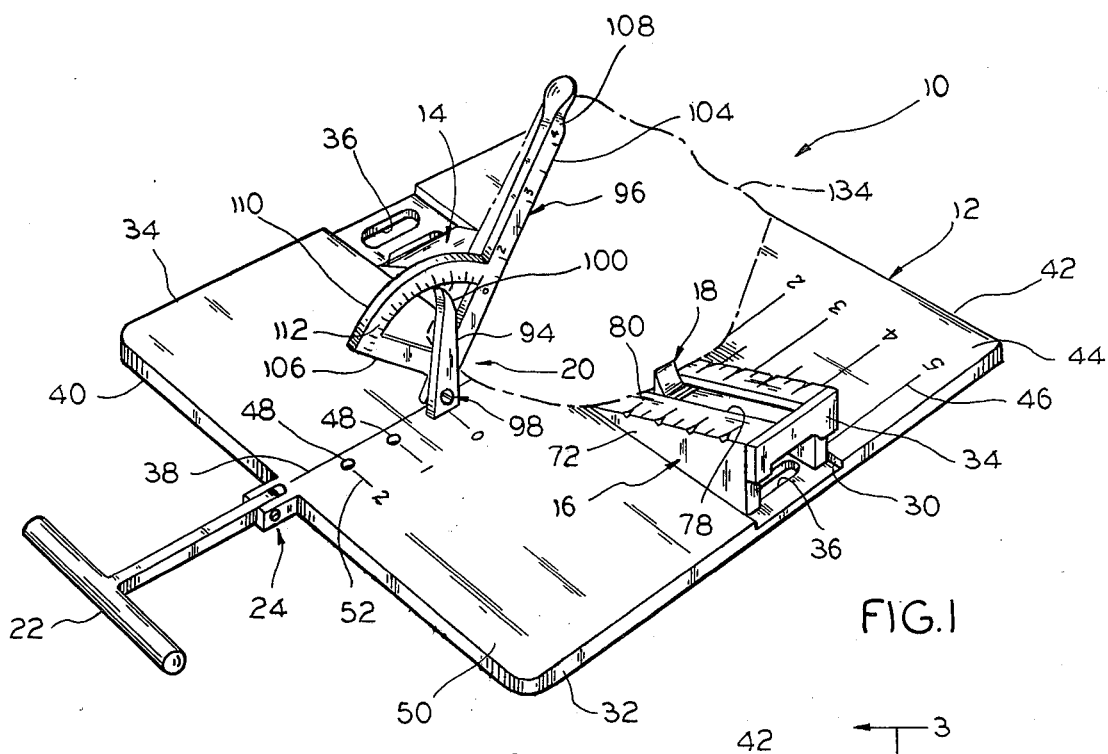
FIG. 1 is a top perspective view of a preferred embodiment of the apparatus, with an equine hoof illustrated in broken lines and showing the apparatus as it appears prior to wedging the hoof.

Referring to the drawings, apparatus 10 for use in altering an equine leg conformation includes a base or baseplate 12, a bracing member or block 14, a wedging member or wedge 16, a tilt indicator 18, and a gauge 20. A carrying handle 22 is connected to the base 12 by pivot means generally indicated at 24. Accessory equipment includes a wedging or prying tool 26, and a scriber-caliper 28.

The base 12 is a generally square or rectangular plate, constructed so as to bear the weight placed by an animal on a leg standing thereon, when the base is supported in a horizontal position on the horizontal surface 29 of a barn or shop floor, or on any other suitable surface. The thickness or height of the base is such as to produce an inconsequential or negligible difference in the level or elevation of the legs in each pair, i.e., the forelegs or hind legs. For example, the base 12 in the illustrative preferred embodiment is a steel plate having a thickness of about ⅜ inch.

The base 12 is provided with a relatively wide central groove 30, substantially rectangular in cross section, which is formed in an upper, supporting surface 31 on the base and extends between opposite side edges 32 and 34 thereof. Two groups of four equidistantly spaced oblong lug-receiving recesses or holes 36 are formed in the bottom of the groove 30, on opposite sides of the center of the base 12. The spacing of both groups of recesses 36 from the center of the base is the same, and the spacing between recesses in both groups is the same.

A center line 38 is provided on the base 12, in a suitable manner, the line being inscribed in the supporting surface 31 in the illustrative embodiment. The center line 38 extends through the center of the base 12, perpendicularly to the groove 30, from the front end edge 40 of the base to the rear end edge 42 thereof. The rear base portion 44 is provided with a linear measure scale 46 extending along the groove 30 and graduated in opposite directions from the center line 38. The illustrative scale also is inscribed in the supporting surface 31 and, alternatively, may be provided in other suitable ways. The scale 46 serves for measurement of the width of a hoof, which determines the shoe width, as subsequently described.

A row of spaced apart cylindrical gauge-mounting openings 48 extends along the center line 38 in the front portion 50 of the base 12 in alignment perpendicular to the groove 30. The openings 48 extend through the base 12 in perpendicular to the supporting surface 31. A scale 52 along the row of mounting openings 48 is graduated in shoe sizes corresponding to the several openings.

A shoe outline 54 is inscribed in the supporting surface 31 of the base 12, and it represents a size "0" horseshoe. The shoe outline is substantially centered on the surface 31, with the right and left (as viewed from the front) sides 56 and 58 of the outline facing the side edges 32 and 34 of the base, the toe 60 of the outline facing the front end edge 40 of the base, and the trailers 62 at the heel of the outline facing the rear end edge 42 of the base. The edge of the toe 60 lies between the graduations for shoe sizes "00" and "0." The trailers 62 extend into the area of the width scale 46.

Figure 2:
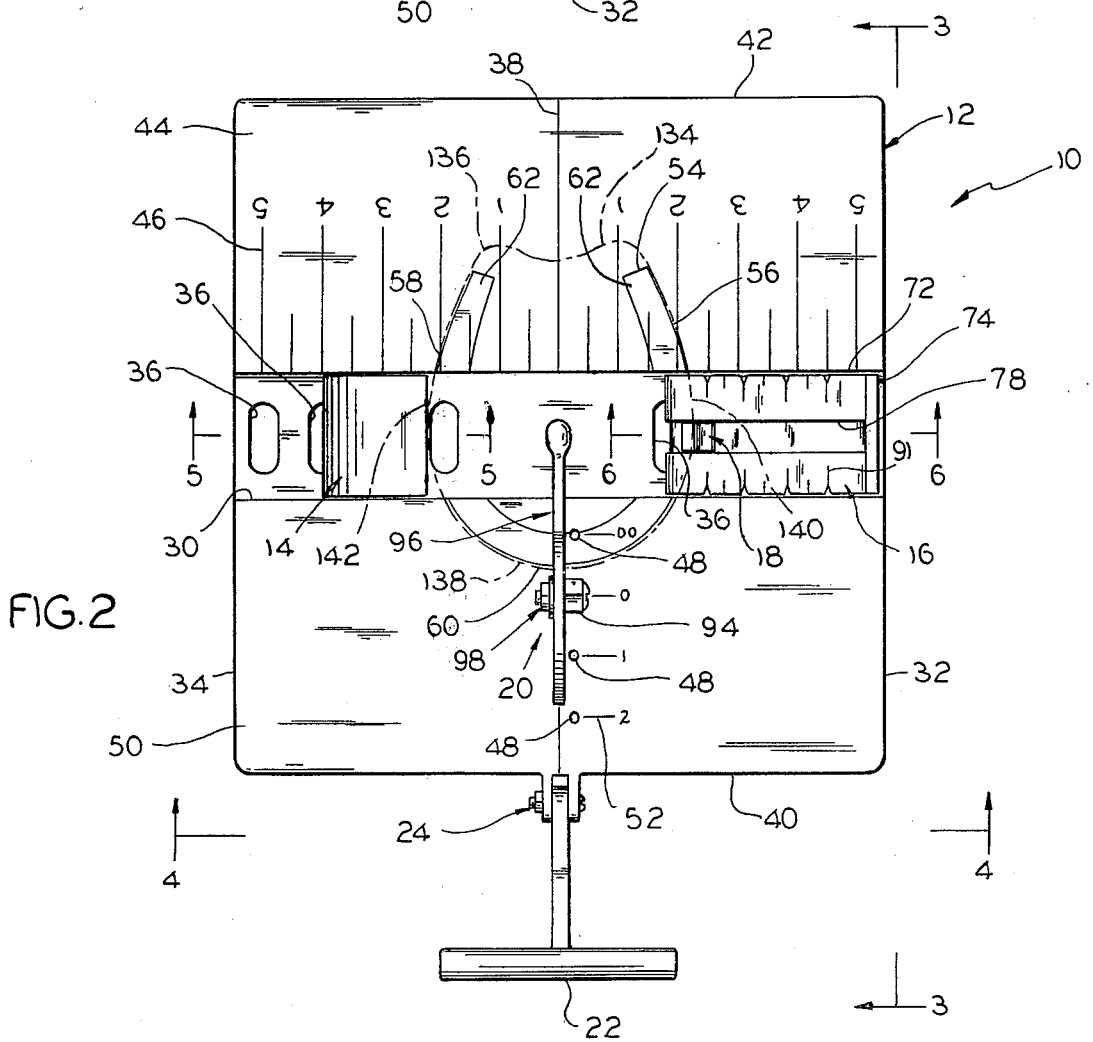
FIG. 2 is a top plan view thereof, with the hoof outlined in broken lines.

The bracing member 14 is a solid block which includes a body 64 having a normally upright stop face 66 (FIG. 5) and an oblong lug 68 integral with and depending from the body. The lug 68 is shaped to fit snugly within a selected one of the lug-receiving recesses 36, on either side of the center line 38. The body 64 has a substantially rectangular bottom surface 70 which is received closely within the groove 30 on the base 12, as seen in FIG. 2, while the greater part of the body projects upwardly from the supporting surface 31, as seen in FIG. 5.

Figure 6:
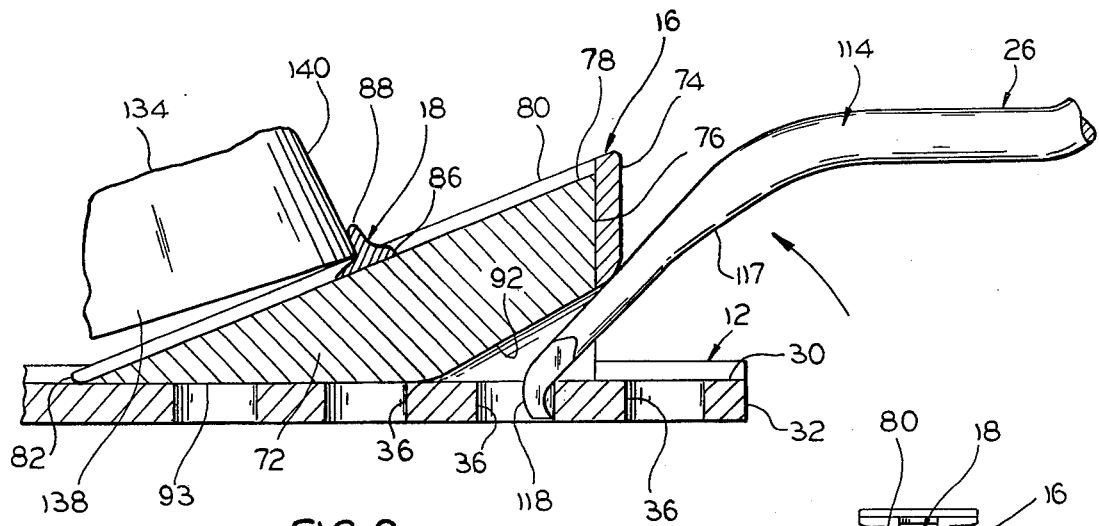
FIG. 6 is an enlarged fragmentary longitudinal sectional view of the apparatus, taken substantially on line 6—6 of FIG. 2, showing a wedging member and a portion of the base, and also showing part of the lever.
Figure 7:
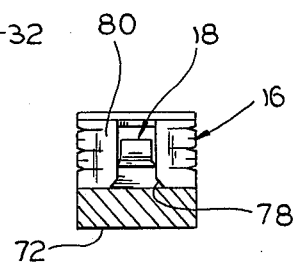
FIG. 7 is a cross sectional view of the wedge, taken substantially on line 7—7 of FIG. 8, with a slide indicator thereon.
Figure 8:
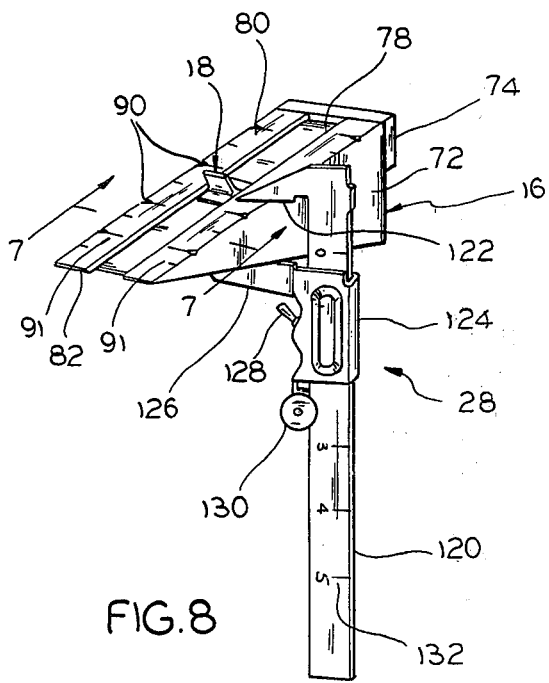
FIG. 8 is a perspective view of the wedge and of a scriber-caliper as it is being set on the wedge.

Referring to FIGS. 6–8, in particular, the wedging member 16 includes a wedge-shaped body 72 and an anvil part 74 affixed to the outer end 76 of the body. An undercut or dovetail indicator groove 78 is formed in an upper, oblique wedging surface 80 of the body 72, and it extends longitudinally and centrally of the body from a substantially V-shaped inner end 82 of the body to its enlarged outer end 76.

The tilt indicator 18 is slidably mountable in the indicator groove 78. The indicator 18 includes a base 86 and an integral engagement flange 88. The base 86 fits into the groove 78 and is received in the undercut portions thereof, so as to be retained on the body 72 during sliding movement thereon. The flange 88 projects upwardly beyond the wedging surface 80, in generally perpendicular relation thereto. Equidistantly spaced notches 90 are provided along opposite edges of the wedging surface 80, and they represent successive altitudes or heights of the body 72. A pair of scales 91 is provided on the surface 80, adjacent to the notches, and each scale is graduated to correspond to the altitudes.

A wedge-shaped cavity or recess 92 is formed in the body 72, and it converges inwardly from the outer end 76 at the bottom surface 93 thereof, beneath the anvil part 74. The bottom surface 93 is generally rectangular, except for the bifurcation resulting from the cavity 92, and it fits closely within the groove 30 in the base 12, as seen in FIGS. 1 and 2. The cavity 92 provides access to a lug-receiving recess 36 beneath the wedging member 16, as illustrated in FIG. 6.

Referring to FIGS. 1–4, the gauge 20 is a conventional gauge, similar to the gauge shown in U.S. Pat. No. 583,706. It includes a support or holder 94 and a combined rule and protractor 96 pivotally mounted at the inner end thereof on the holder, by a nut and bolt connection generally indicated by the number 98. The support 94 includes a pointer 100 at its upper and outer end, and a cylindrical mounting pin 102 (FIG. 3) at its lower and inner end. The pin 102 is rotatably received in a selected one of the gauge-mounting openings 48.

The combined rule and protractor 96 includes a rule 104 and an integral protractor 106 adjacent to the inner end of the rule. The rule 104 is in the form of an elongated straight bar, and it bears a linear measure scale 108 on its side. The protractor 106 includes a curved bar 110 bearing an angular measure scale 112 on its side, which cooperates with the pointer 100.

Referring to FIGS. 4 and 6, the wedging tool 26 includes a lever 114 and a handle 116 secured thereto. The lever 114 includes a lever arm 117 connected to the handle 116, and a hook portion 118 at the outer end of the lever arm. The hook portion 118 is received in a lug-receiving recess 36 in the base 12, where it engages the wall of the recess. The lever arm 117 is engageable with the wedging member 16, at the lower edge of the anvil part 74.

Figure 9:
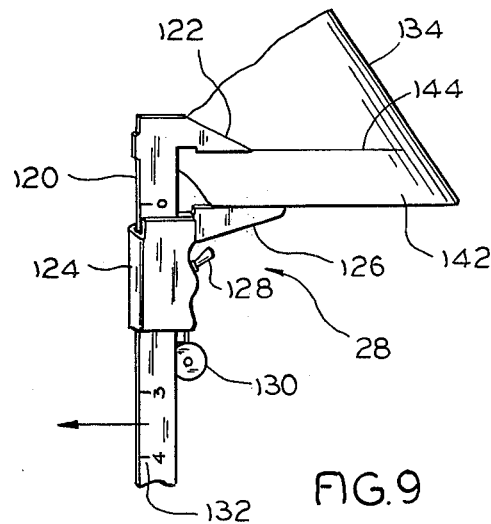
FIG. 9 is a side elevational view of the hoof and the scriber-caliper in the process of scribing the hoof.

Referring to FIGS. 8 and 9, the scriber-caliper 28 is a modified conventional caliper structure, and it includes a bar 120 having a pointed scribing jaw 122 fixed to one end thereof, a slide 124 slidably movable on the bar and having a guide jaw 126 fixed to its inner end, a slide-locking lever 128 on the slide, and a slide-adjustment roller 130 connected to the slide and movable on the bar. A linear measure scale 132 is provided on the bar 120, and it cooperates with the slide 124 to give an indication of the distance between the opposed inner surfaces of the jaws 122 and 126, in the usual manner for a caliper of this type.

When the conformation of a horse's leg, or other equine leg, is to be altered, the hoof 134 initially is prepared, if need be, by rasping its bottom surface until flat. The hoof then is placed on the supporting surface 31 of the base 12, preferably while the horse is tethered. With the bracing member 14 and the wedging member 16 each to one side of the center of the base, and with the gauge 20 removed, if desired, the hoof 134 is placed over the shoe outline 54, so that the heel 136 of the hoof is in substantially the proper position with respect to the trailers 62 of the shoe outline 54, as illustrated in FIG. 2. The shoe size may be determined by observing the position of the toe 138 of the hoof, which in the illustration indicates shoe size "0."

The gauge 20 is placed on the base 12, with its mounting pin 102 in the gauge-mounting opening 48 which corresponds to the shoe size. The length of the hoof 134 may be measured then with the rule 104, and the frontal angle of the hoof may be measured with the protractor 106, while the gauge 20 is centrally oriented, along the center line 138, as illustrated in FIGS. 1-4. Should it be necessary to rasp the hoof 134 to conform its dimensions to those of the hoof on the mating leg, it is done prior to the wedging step.

With the hoof centered on the supporting surface 31, the width between the right and left (as viewed from the front) quarters or sides 140 and 142 of the hoof may be measured on the width scale 46. From this dimension, the necessary width for the shoe to be placed on the hoof is determined. Adjustments in width are made by spreading or by bringing together the trailers of the horseshoe, as necessary.

Referring to FIGS. 1, 2, 4 and 5, with the bracing member 14 mounted so that its stop face 66 is against one quarter 142 of the hoof 134 and with the wedging member 16 acting against the remaining quarter 140, the hoof is tilted by wedging, until a desired altered leg conformation is obtained. Initially, the pointed inner end 82 of the body 72 of the wedging member is in the groove 30, as illustrated in FIG. 6, and may be inserted freely for a short distance beneath the hoof 134, as illustrated in FIG. 2. With the animal's weight on its leg, the wedging member 16 is advanced beneath the hoof to tilt it with respect to the supporting surface 31. For this purpose, the wedging tool 26 is operated with its hook portion 118 in a recess 36, engaging the base 12 as a fulcrum, and with its lever arm 117 urged against the anvil part 74, in the manner illustrated in FIG. 6. Alternatively, the wedge member 16 may be advanced by driving with hammer blows applied to the anvil part 74. The tilt indicator 18 on the wedging member 16 is engaged by the adjacent quarter 140 of the hoof, which moves the indicator upwardly and outwardly in its groove 78.

As the hoof 134 is tilted from the side in the foregoing manner, the condition of the animal's leg is observed. To aid in judging the straightness of the leg, the gauge 20 is oriented with the rule 104 thereof in alignment with the center line 38. The rule 104 then serves as a guide to proper alignment of the leg, the alignment of the rule being compared visually with the leg conformation.

Where the leg conformation is being altered to relieve pressure on a joint surface, the foregoing procedure may be performed together with the taking of X-rays showing the condition of the joint. If necessary, further alteration may be made. In any case, if a desirable leg conformation is not obtained by tilting the hoof 134 on one side, or when it appears desirable initially, the tilting procedure may be performed on the other side of the hoof. In such case, the bracing member 14 and the wedging member 16 are transposed on the base 12. The bracing member 14 is disposed with its stop face 66 against the right quarter 140 of the hoof, while the wedging member 16 is directed against the left quarter 142.

Referring to FIGS. 6-9, the hoof 134 may be lifted off of the wedging member 16, and the position of the indicator 18 represents the level to which the adjacent side of the hoof was raised to obtain the desired leg conformation. Accordingly, the scriber-caliper 28 may be used to take the height measurement directly off of the wedging member body 72, at the indicator position, in the manner illustrated in FIG. 8. Alternatively, the dimension as indicated by the indicator 18 may be read off of an altitude scale 91 and set on the caliper. With the locking lever 128 in locked position to secure the slide 124 and the guide jaw 126 in place, the instrument is used to scribe the hoof 134, as illustrated in FIG. 9. On the side of the hoof opposite to the side which was raised by the wedging member 16, the guide jaw 126 is inserted beneath the quarter 142, and the point of the scribing jaw 122 is urged against the hoof. The instrument is drawn across the quarter 142, to scribe a trim line 144 thereacross.

The hoof 134 thus having been marked for trimming, the hoof is rasped so as to remove the hoof material below a plane extending from the trim line 144 to the lower outer edge of the opposite quarter 140. That is, the hoof material below the plane represented by the broken line 146 in FIG. 4 is removed. It will be noted that the plane 146 in that view is parallel to the horizontal supporting surface 31, so that, thereafter, the hoof 134 will assume in normal use the same attitude as obtained by wedging and as illustrated in FIG. 4. Consequently, the altered leg conformation obtained by wedging the hoof likewise will remain the same in normal use, thereby correcting the abnormality.

As an alternative corrective measure, a shoe for the hoof 134 may be built upon the same side as the quarter 140 and to the same extent as the quarter 140 was raised by the wedging member 16. The alternative procedure may be used when it is preferred not to remove additional hoof material. In either case, the procedure is completed by shoeing the animal and rasping the quarters of the hoof down to the shoe, in the usual manner.

The measurements made in the course of the procedure may be recorded for future use. In a mature animal, the hoof may be trimmed to the same size and shape each time. With a growing animal, the leg conformation may improve, so that succeeding alterations may differ, and, eventually, may no longer be required.

The apparatus 10 is readily carried from place to place, with the parts and accessories enclosed in a suitable carrying case, if desired. The handle 22, connected to the front end edge 40 of the base, may serve as the handle for the carrying case. The apparatus thus serves as a conveniently available means for providing proper animal care at any appropriate location.

While preferred embodiments of the method and apparatus of the invention have been described and illustrated, it will be apparent to those skilled in the art that various changes and modifications may be made therein within the spirit and scope of the invention. It is intended that such changes and modifications be included within the scope of the appended claims.

I claim:

1. Apparatus for use in altering an equine leg conformation and which comprises:
    a base providing a supporting surface for an equine hoof,
    means on the base for bracing the hoof against shifting movement, and
    a wedge advanceable on the base in the direction of the bracing means to wedge the hoof for tilting it with respect to the supporting surface into an attitude which serves to provide a desired altered leg conformation.

2. Apparatus as defined in claim 1 and including an elongated bar arranged on the base for use as a guide to proper alignment of the leg.

3. Apparatus as defined in claim 2 and wherein said bar comprises the rule of a pivotally mounted combined rule and protractor.

4. Apparatus as defined in claim 1 and including means forming an elongated groove in said supporting surface in which said wedge travels.

5. Apparatus as defined in claim 1 and including an indicator slidable on said wedge and engageable with the hoof to indicate the amount of tilt.

6. Apparatus as defined in claim 1 and wherein said bracing means is selectively mountable on either side of the center of said base, and said wedge may be advanced in the direction of the bracing means from the opposite side.

7. Apparatus as defined in claim 6 and including means forming an elongated groove in said supporting surface in which said wedge travels.

8. Apparatus as defined in claim 7 and wherein said bracing means comprises a block having a bottom lug, and including means forming a plurality of recesses in the bottom of said groove, said lug being received in a selected one of said recesses for securing the block in place, said recesses being adapted alternatively to receive in a selected one of them the end of a lever engageable with said wedge for advancing the same to tilt the hoof.

9. Apparatus as defined in claim 7 and including a combined rule and protractor, means for pivotally supporting said combined rule and protractor, and means for selectively mounting said supporting means on said base at one of a plurality of positions aligned transversely of said groove, said rule being arranged for use as a guide to proper alignment of the leg.

10. Apparatus for use in altering an equine leg conformation and which comprises:
    a base providing a supporting surface for an equine hoof,
    means selectively mountable on either side of the center of said base for bracing the hoof against shifting movement,
    means forming an elongated groove in said supporting surface,
    wedge means advanceable in said groove in the direction of said bracing means for tilting the hoof disposed therebetween with respect to said supporting surface into an attitude which serves to provide a desired altered leg conformation, and
    an indicator slidable on said wedge means and engageable with the hoof to indicate the amount of tilt.

11. Apparatus as defined in claim 10 and including a combined rule and protractor, means for pivotlly supporting said combined rule and protractor, and means for selectively mounting said supporting means on said base at one of a plurality of positions aligned transversely of said groove, said rule being arranged for use as a guide to proper alignment of the leg.

12. Apparatus as defined in claim 11 and wherein said bracing means comprises a block having a bottom lug, and including means forming a plurality of recesses in the bottom of said groove, said lug being received in a selected one of said recesses for securing the block in place, said recesses being adapted alternatively to receive in a selected one of them the end of a lever engageable with said wedge means for advancing the same.

13. A method of altering an equine leg conformation which comprises:
    bracing an equine hoof against shifting movement while standing on a supporting surface,
    wedging the hoof to tilt it with respect to the supporting surface into an attitude which serves to provide a desired altered leg conformation, and
    altering the support for the leg to provide a hoof attitude in normal use equivalent to the aforesaid attitude.

14. A method as defined in claim 13 and wherein said alteration is effected by trimming the hoof.

15. A method as defined in claim 13 and wherein said alteration is effected by attaching to the hoof a corrective shoe.

16. A method of altering an equine leg conformation which comprises:
    providing a base having a supporting surface for an equine hoof and means for bracing the hoof on the base against shifting movement,
    placing an equine hoof on the supporting surface against the bracing means,
    inserting a wedge beneath the hoof and advancing the wedge against the hoof in the direction of the bracing means to tilt the hoof with respect to the supporting surface into an attitude which serves to provide a desired altered leg conformation, and
    altering the support for the leg to provide a hoof attitude in normal use equivalent to the aforesaid attitude.

17. A method as defined in claim 16 and wherein one quarter of the hoof is placed against the bracing means and the wedge is advanced against the opposite quarter to tilt the hoof into an attitude which serves to straighten a previously crooked leg.

* * * * *